United States Patent [19]

Greshes

[11] Patent Number: 4,474,355
[45] Date of Patent: Oct. 2, 1984

[54] APPARATUS FOR MOLDING OPTICAL PLASTIC LENSES OF THE STANDARD AND BIFOCAL TYPE

[76] Inventor: Martin Greshes, 70 Corey La., East Meadow, N.Y. 11554

[21] Appl. No.: 59,906

[22] Filed: Jul. 23, 1979

Related U.S. Application Data

[62] Division of Ser. No. 810,357, Jun. 27, 1977, Pat. No. 4,190,621.

[51] Int. Cl.³ .............................................. B29D 11/00
[52] U.S. Cl. .................................... 249/53 R; 249/82; 249/93; 249/117; 249/155; 425/808
[58] Field of Search ............................ 425/808; 264/1; 249/53 R, 82, 93, 155, 117

[56] References Cited

U.S. PATENT DOCUMENTS

| | | |
|---|---|---|
| 2,304,217 | 12/1942 | Tillyer . |
| 2,728,106 | 12/1955 | Herman et al. ...................... 425/808 |
| 2,890,486 | 6/1959 | Crandon ............................... 425/808 |
| 3,248,460 | 4/1966 | Naujokas .............................. 425/808 |
| 3,555,610 | 1/1971 | Reiterman ............................ 425/808 |
| 3,938,775 | 2/1976 | Sarofeen .............................. 425/808 |
| 3,946,982 | 3/1976 | Calkins et al. ....................... 425/808 |
| 4,085,919 | 4/1978 | Sullivan ............................... 425/808 |
| 4,095,772 | 6/1978 | Weber .................................. 425/808 |

*Primary Examiner*—James B. Lowe
*Attorney, Agent, or Firm*—Philip D. Amins

[57] ABSTRACT

Apparatus is provided for fabricating ophthalmic lenses of the single vision and bifocal type comprising a holder having a base portion for support thereof. An outer circumferential side wall extends upwardly from the base portion and terminates in an upper surface which is disposed in substantially parallel relationship of the bottom surface of the holder base portion. The side walls comprise a plurality of equally spaced support posts. The support posts are provided with a lower step and an upper step with the upper step being disposed radially outwardly of said lower step. The lower steps define a parallel support surface upon which there is disposed a lower mold. The upper steps define a parallel support surface upon which is disposed an upper mold. The upper and lower support surfaces being disposed in substantially parallel relationship. The upper and lower molds are spaced from one another by means of vertically extending shoulders disposed intermediate the lower and upper steps of each of the support posts.

17 Claims, 12 Drawing Figures

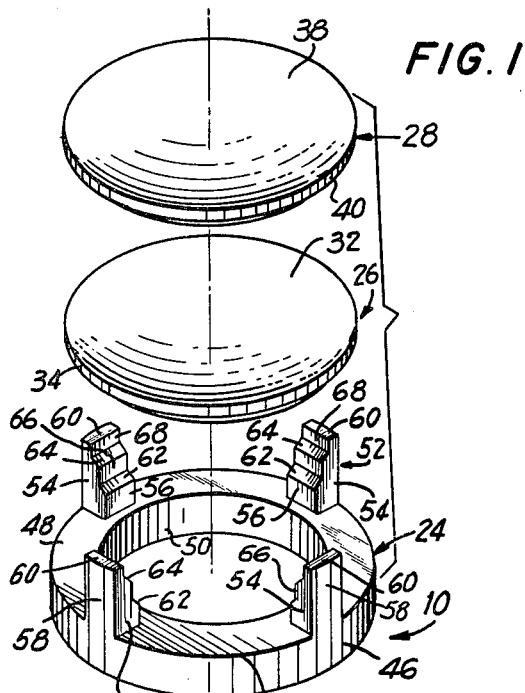
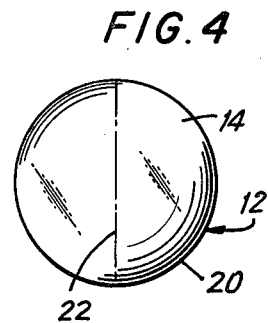
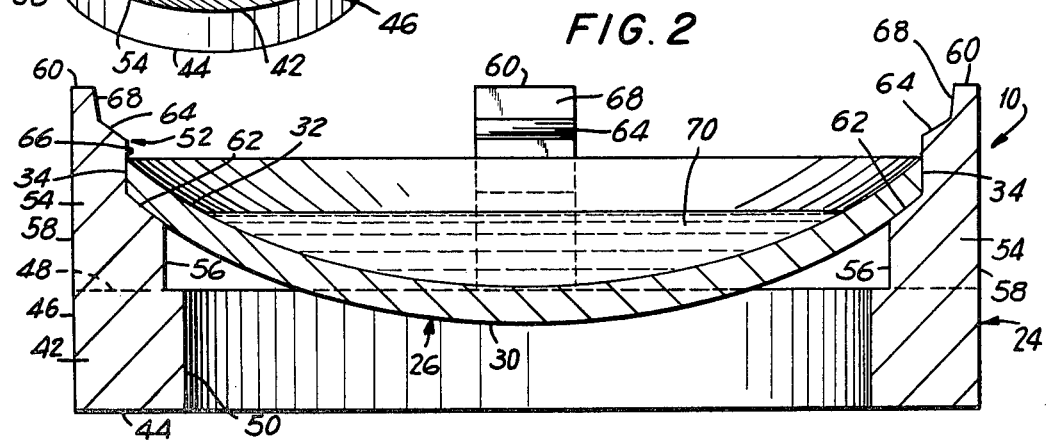
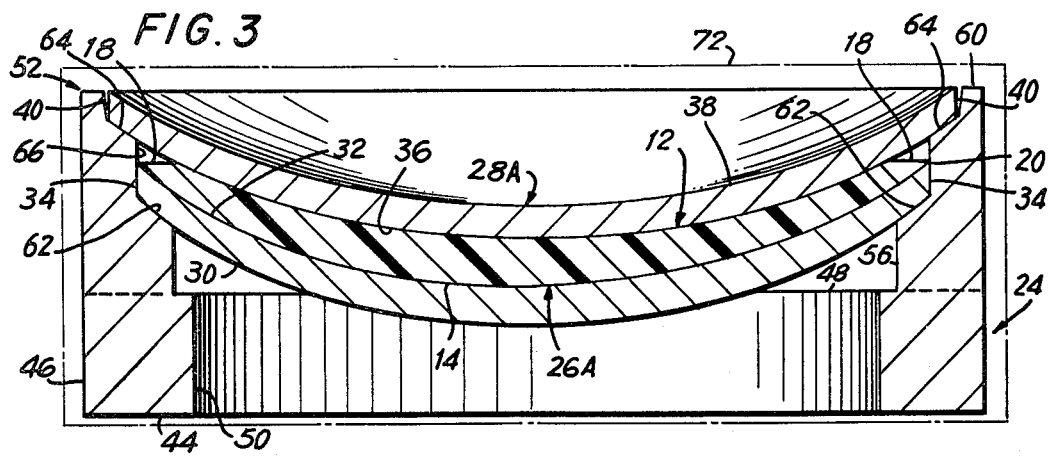

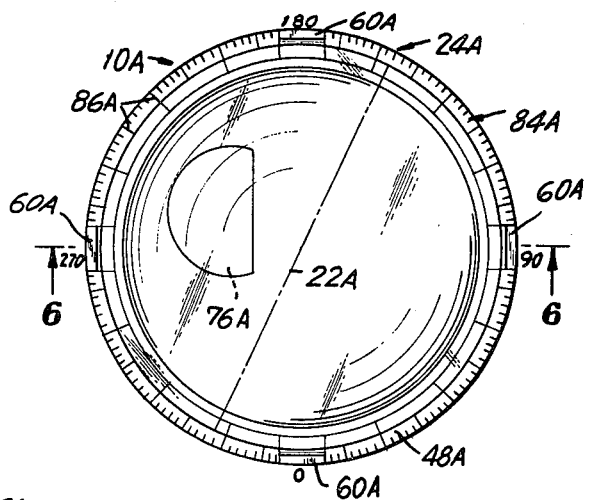
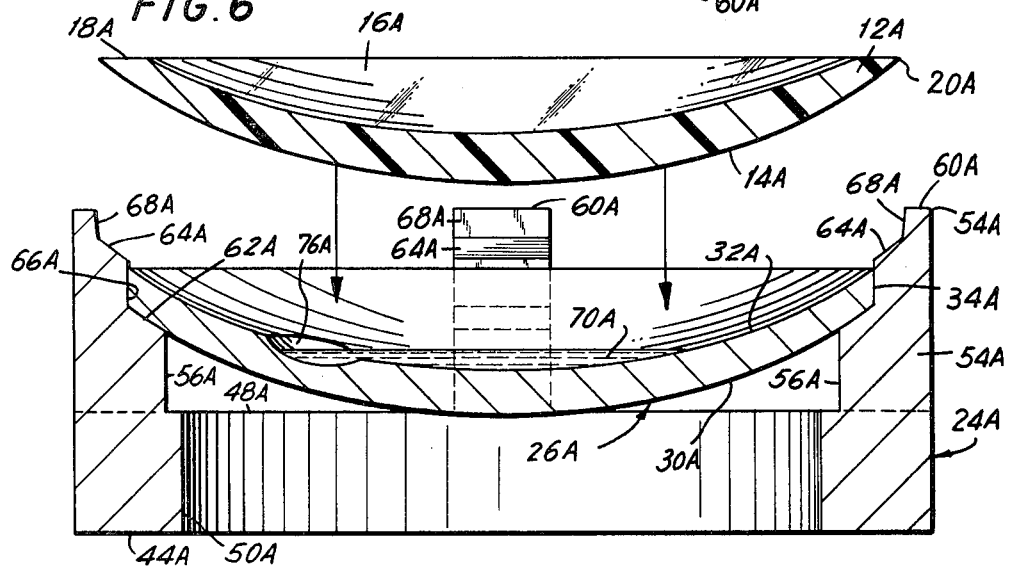
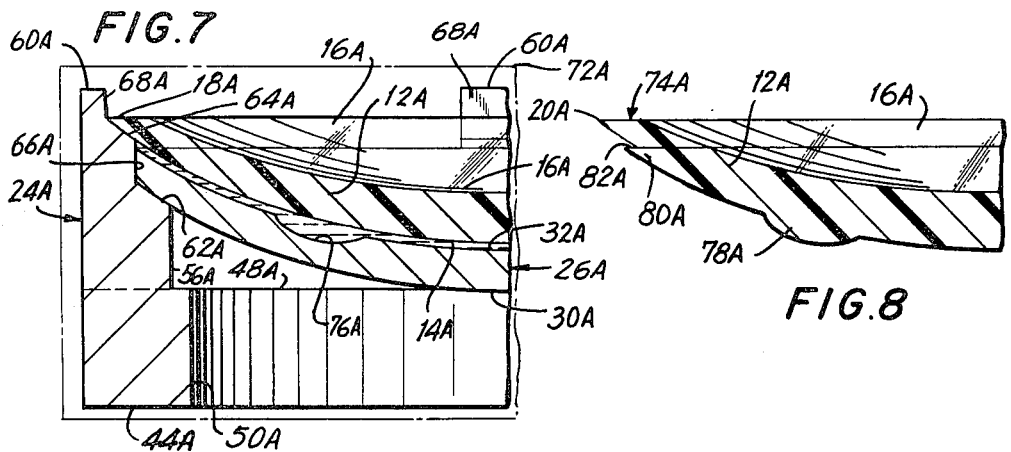

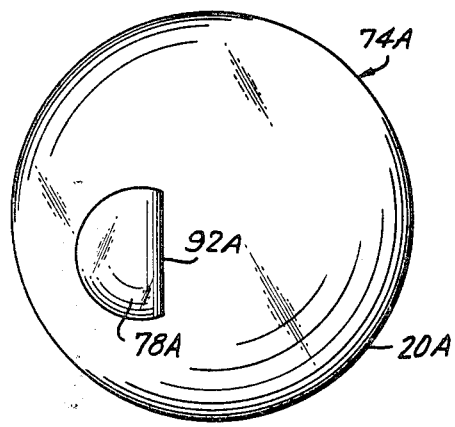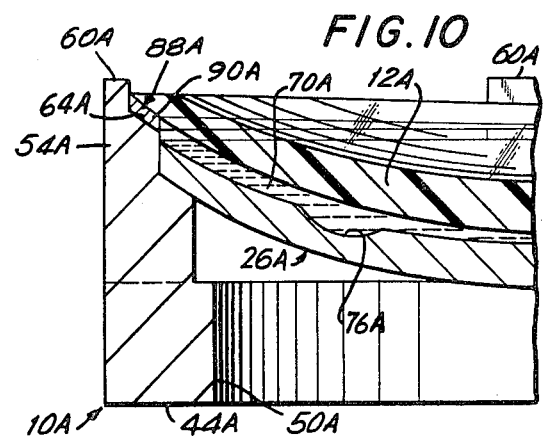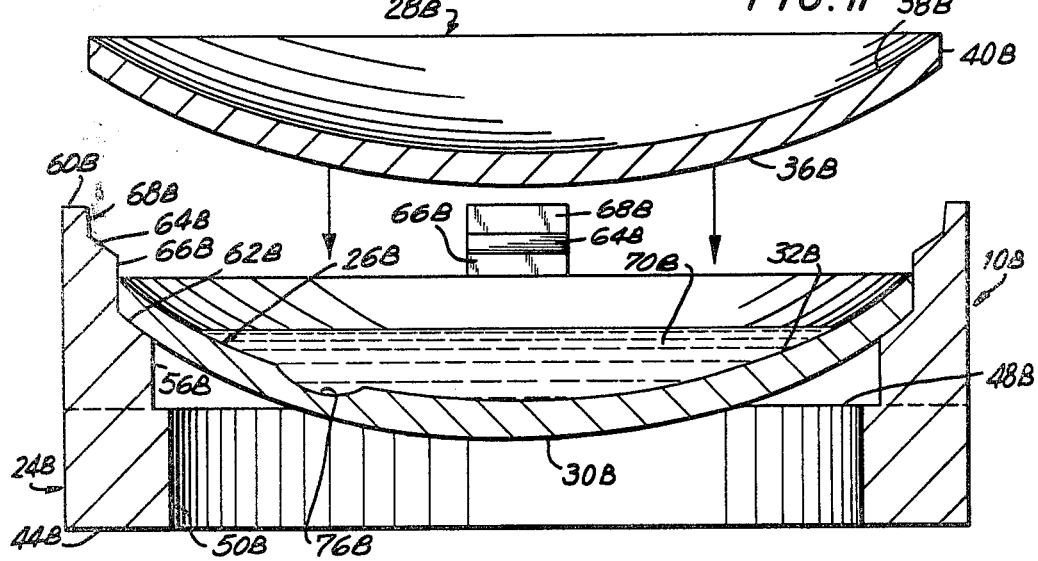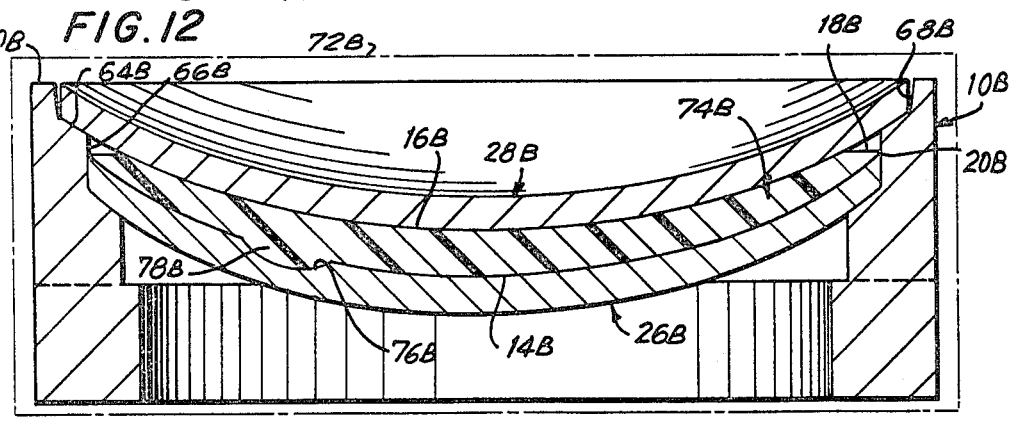

APPARATUS FOR MOLDING OPTICAL PLASTIC LENSES OF THE STANDARD AND BIFOCAL TYPE

CROSS REFERENCE TO RELATED APPLICATION

The present application is a divisional of my co-pending patent application Ser. No. 810,357, filed June 27, 1977, entitled METHOD FOR MOLDING OPTICAL PLASTIC LENSES OF THE STANDARD AND BIFOCAL TYPE, now U.S. Pat. No. 4,190,621, issued Feb. 26, 1980.

BACKGROUND OF THE INVENTION

1. Field of the Invention

The present invention pertains to the manufacture of ophthalmic lenses and in particular to bifocal ophthalmic lenses.

Bifocal lenses require a distance correction, an astigmatic correction, an axis for the astigmatic correction ranging from 0° to 180°, proper decentration, and a reading correction. Because of the nearly infinite number of possible combinations of these corrections, it has become both impossible and unfeasible for the laboratory to stock finished bifocal prescription lenses. Therefore, the manufacturer usually supplies the laboratory with a semi-finished blank. This blank has a finished front surface and a semi-finished rear surface, the rear surface being ground and polished to achieve the finished prescription, and the front surface containing a distance curvature and a bifocal addition. Conceivably, the manufacturer could, with the same effort, cast the finished prescription, but the economics of the industry do not permit the casting of individual prescriptions by the manufacturer, and, instead, he mass produces semi-finished blanks.

The laboratory, which is oriented to filling individual prescriptions, therefore, grinds and polishes the rear or concave surface of the concave-convex lens to conform to the finished prescription by taking into account the distance correction, the astigmatic correction, decentration, the axis of the astigmatic correction, and the bifocal addition. Ideally, it would be best for the laboratory to cast its own finished prescription rather than to buy the simi-finished blank, but the lack of technology at the laboratory operation and the economics of the operation simply do not permit the casting of individual prescription lenses.

Some of the problems involved in the casting of plastic lenses are that the plastic shrinks by about 15%, and that the mass of the cast plastic generates an exothermic reaction. The normal prescription requires casting two dissimilar curvatures, front and back, and this in turn may produce lenses having a greater center thickness and thinner edge thickness, or greater edge thickness and thinner center thickness. This further complicates the casting technique because the dissimilar center and edges must both shrink the same 15% and the technique used to have the molds conform to these dissimilar shrinkages is part of the art of casting plastic prescription lenses. Furthermore, the mass of plastic cast generates its own exothermic reaction and it is necessary during the initial portion of the curing cycle to introduce heat to intiate reaction and during the latter parts of the reaction to remove heat in order to keep the reaction under control. However, casting thin films and parallel surfaces can easily be accomplished since the exothermic reaction is negligible, the surfaces are substantially parallel, and the 15% shrinkage causes no appreciable reduction in mass. Thus, if a laboratory could make a finished bifocal lens by casting thin films, it might avoid the difficult task of grinding and polishing semi-finished blanks provided by the manufacturer.

2. Description of the Prior Art

Staehle (U.S. Pat. No. 2,339,433) discloses a method of adding a correction to a molded plastic lens. He does this by adding a thin level of resin. However, Staehle is only concerned with conventional-type lenses, those with only one focus, and furthermore, with changing the curvature of the lens. The bifocal lens, which has two foci, is not possible of production with Staehle's method. He does not disclose how two different foci can be effected by adding a resin layer to an existing lens.

Calkins (U.S. Pat. No. 3,946,982) discloses a method for casting multifocal lenses. However, this method requires two mold portions held together by a gasket, one of the molds having a recessed portion, so as to provide a bifocal effect. The liquid plastic is injected between the two mold portions, cured and cooled thus creating an entirely new lens, whereas applicant simply transforms an existing lens into a bifocal lens. Some of the problems with using gaskets are that they are expensive and that the assembly of the molds and gaskets requires expensive hand labor.

Naujokas (U.S. Pat. No. 3,248,460) discloses a method for casting multifocal lenses. However, this method utilizes the base blank whose curvature is only about half the curvature of the predetermined power of the composite lens. This requires, in order to complete casting the bifocal, the casting of a relatively large amount of mass of non-parallel surfaces which presents the ensuing problems of shrinkage and heat dissipation.

OBJECTS OF THE INVENTION

It is the primary object of the present invention to provide a new and novel means for the manufacture of a lens having the bifocular portion case in the lens in prescribed positionment relative to the astigmatic axis.

It is yet another object of the present invention to provide new and novel apparatus for the manufacture of ophthalmic lenses.

It is yet a further object of the present invention to provide means of making a bifocal lens by casting and incorporating a thin parallel film onto and with an existing lens.

It is yet another object of the prevent invention to provide a simplified means of producing a multi-focussed lens.

It is still a further object of the present invention to provide a new and novel holder for casting ophthalmic plastic lenses of the standard and bifocal types, which delineates the necessity and cost of utilizing gaskets.

SUMMARY OF THE INVENTION

In accordance with one embodiment of the present invention, a complete bifocal lens is produced without the need to first supply a previously formed blank lens. This permits the lens manufacturer to easily produce a lens to the exact requirements set forth in the prescription.

The bifocal lens is produced by supporting a bifocal lower mold having a recessed bifocal well area on its concave surface and filling the lower mold with a resin material. Thereafter positioning an upper mold in vertically spaced relationship to the lower mold, whereby the resin material is displaced to extend between the overlapping surfaces of the molds to form the configuration of the bifocal lens with a bifocular portion on the convex lens surface corresponding to the bifocal well on the lower mold. By curing the resin material situated between the molds, and then cooling the resin material and the molds, a bifocal lens is produced. The bifocal lens is then separated from between the molds.

The holder for the molds is designed for indicating visually the positionable angular degree of orientation of the bifocular portion relative to the astigmatic axis being formed on the bifocal lens in prescribed positionment relative to the astigmatic axis. The aligning of the astigmatic axis of the upper mold relative to the recessed well in a predetermined orientation, is such that the bifocular portion is formed on the bifocal lens in a desired position dependent upon the prescribed needs of the prospective user thereof.

In accordance with another embodiment of the present invention, the laboratory is provided with a single vision lens, which already contains the distance portion and the astigmatic correction, and a bifocal mold, which has the same radius of curvature as does the front surface of the lens and which has a recessed portion, so that two different thicknesses of film can be deposited on the lens. A small amount of a liquid plastic material is deposited in the bifocal mold held concave surface up. The lens is then placed in the mold, thereby spreading the liquid so it completely fills the space between the lens and the mold.

A suitable support is preferably used to hold the lens a few thousandths of an inch above the mold, to hold the astigmatic correction at its proper angle, and to provide the proper decentration of the bifocal portion. The combined assembly is then run through a curing cycle in an oven. After curing, the assembly is allowed to cool. By inserting a razor at the edge of the point of contact between the lens and the mold, the now compound lens will separate readily from the mold, the lens including therewithin the newly cast bifocal portion, and having the desired distance correction, the astigmatic correction at the proper axis, decentration, and the reading correction, all in the proper location.

The present invention also performs all the functions of the presently used gasket. It orients the convex lens surface and the concave mold surface so that they remain one directly over the other and so that they remain parallel; it maintains a separation between the mold and the lens; it retains the plastic liquid in the mold; and it allows shrinkage to occur.

BRIEF DESCRIPTION OF THE DRAWINGS

The foregoing and other objects, features and advantages of the present invention will become readily apparent to those skilled in the art from a reading of the detailed description hereinafter, when considered in conjunction with the accompanying drawings, wherein:

FIG. 1 is a perspective view of a first embodiment, in exploded relationship, of a new assembly for forming of lenses comprised of a holder having cooperating upper and lower molds;

FIG. 2 is a slightly enlarged sectional view of the initially assembled holder having the lower mold positioned thereon and showing also the deposit of the liquid plastic material;

FIG. 3 is a sectional view similar to FIG. 2 having the upper mold positioned thereon;

FIG. 4 is a top plan view of a lens formed with the apparatus illustrated in FIGS. 1 through 3;

FIG. 5 is a top plan view of a holder illustrating another embodiment of the present invention in the manufacture of a bifocal lens;

FIG. 6 is a section view similar to FIG. 2 showing the formation of a bifocal lens with the deposit of the liquid plastic material for bonding to a previously formed lens;

FIG. 7 is a fragmentary sectional view including the positioning of the lens on the holder and the movement of the liquid thereupon;

FIG. 8 is a fragmentary sectional view of the completed bifocal lens;

FIG. 9 is a top plan view of a bifocal lens formed with the apparatus illustrated in FIGS. 5 through 7;

FIG. 10 is a view similar to FIG. 7 illustrating a modified step in the process;

FIG. 11 illustrates another embodiment of the present invention, and is a view similar to FIG. 6 except that the complete bifocal lens is fabricated without the use of a previously formed lens; and FIG. 12 is a view similar to FIG. 3 illustrating the formed lens therein.

DETAILED DESCRIPTION OF THE PREFERRED EMBODIMENTS

Referring now to the drawings and, more particularly to FIGS. 1 through 4, there is shown a first embodiment of an apparatus 10 for the manufacturing of a lens 12 that is formed having a pair of oppositely disposed spaced apart surfaces 14 and 16. Surface 14 being the one having the convex spherical curvature, and the surface 16 having the inner concave cylindrical curvature. The surfaces 14 and 16 are connected by an outer end 18 extending therebetween and terminating in an outer edge 20, which as illustrated in FIG. 4, may have a circular configuration.

The lens 12 is formed having an astigmatic axis 22 illustrated by the broken lines in FIG. 4. To manufacture lens 12, there is provided a holder 24 which is utilized in conjunction with a lower or bottom mold 26 and an upper or top mold 28. The configuration of the molds 26 and 28 is such that lenses 12 can be cast with constant front curvatures over an extended range of foci and astigmatic corrections. These lenses 12 may be made of glass, plastic, or any other suitable material known in the art.

The molds 26 and 28 are preferably made either of glass or of electro-formed metal. The lower mold 26 includes an outer surface 30, which may be convex and an inner surface 32 which may be concave, with an intermediate or end wall 34 joining together the oppositely disposed surfaces 30 and 32.

The end wall 34 preferably has a circular configuration which may substantially coincide with the outer edge 20 formed on lens 12. The upper mold 28 includes an outersurface 36 which may have a convex configuration and an inner or rearward surface 38 which may have a concave configuration. An intermediate or end wall 40 joins together the oppositely disposed surfaces 36 and 38. The end wall 40 preferably has a circular configuration, which as illustrated in FIG. 3, may exceed the diameter defined by the outer edge 20.

To permit the manufacture of the lens 12, having various selected angles of curvature, depending upon the configurations of molds 26 and 28 that are selected, the apparatus consisting of the holder 24 is utilized. The holder 24 includes a base portion 42 which has a bottom surface 44 on which the holder 24 may be supported during use thereof. Base portion 42 has an outer circumferentially extending side wall 46 which may have a circular or other configuration. An upper surface 48 extends in substantially parallel spaced relationship to the bottom surface 44 and there may be provided a recess or through bore 50 extending intermediate the surfaces 44 and 48.

Support means 52 is operatively associated with the base portion 42 of the holder 24 so as to maintain the molds 26 and 28 in removably supportive vertically spaced position relative to each other such that the lens 12 is formed intermediate the overlapping opposing surfaces 32 and 36 of the molds 26 and 28, respectively. The holder 24 may be fabricated from any suitable material; e.g. any metal capable of withstanding the temperatures to which the molds 26 and 28 are to be subjected.

The support means 52 may be formed from a plurality of support posts 54 that may be integrally formed with and extend upwardly from the upper surface 48 of the base portion 44. Each support post 54 may be defined by a front surface 56 and a rear surface 58 that extend in spaced relationship to each other. Each post 54 may be dimensioned such that the rear surface 58 coincides with the side wall 46 of base portion 42 and terminates in a top or distal end 60.

The support posts 54 may be circumferentially and substantially equally spaced from each other. The support means 50 further comprises a lower step 62 provided in each of the support posts 54 for use in conjunction with the lower mold 26. An upper step 64 is similarly provided in each of the support posts 54 and similarly faces inwardly so as to be capable of removably supporting the upper mold 28 in the position illustrated in FIG. 3. The steps 62 and 64 being in substantially parallel relationship to each other so as to obtain a controlled thickness of the lens 12 to be formed intermediate the overlapping molds 26 and 28.

To maintain the molds in proper position relative to each other during the formation of lens 12, there is provided a vertically extending shoulder 66 extending intermediate the lower step 62 and upper step 64, on each of the support posts 54. To prevent inadvertent movement of upper mold 28, there is provided a substantially vertically extending shoulder 68 extending between upper step 64 and distal end 60.

Shoulder 66 is appropriately dimensioned to confine the end wall 34 of lower mold 26. Shoulder 68 is appropriately dimensioned to confine the end wall 40 of upper mold 28. As illustrated in FIGS. 2 and 3, the shoulder 68 extends outwardly beyond shoulder 66 to accommodate the molds 26 and 28 having differing outer diameters. Each of the steps 62 and 64 is downwardly and inwardly inclined to substantially conform to the angular configuration of the molds 26 and 28.

In this manner the holder 24 is capable of being utilized to form lenses having various particular configurations. The process by which a particular lens 12 is manufactured is that a previously selected lower mold 26 is positioned on the support posts 54 and retained in place by the lower steps 62. Once this is accomplished there is a filling of the lower mold 26 with a resin material 70. In its liquid form the resin material 70, as illustrated in FIG. 2, is now ready to be initially formed. The initial formation of the lens 12 takes place by positioning the upper mold 28 in vertically spaced relationship to the lower mold 26. This is accomplished since the upper steps 64 are dimensioned to readily receive the upper mold 26 thereon, whereby the resin material 70 is displaced to extend between the overlapping surfaces 32 and 36 of the molds 26 and 28, respectively, to form the configuration of the lens 12.

In the assembled position of the molds 26 and 28, as illustrated in FIG. 3, there may occur a curing of the resin material 70 which may take place in an oven 72, illustrated in phantom, and a subsequent cooling of the resin material 70 to a temperature at which a separating of the lens 12 from between the molds 26 and 28 may take place.

A second embodiment of the present invention and, in particular, of the formation of a lens having a bifocular portion or segment, is illustrated in FIGS. 5 through 10, wherein similar parts are denoted by similar reference numerals. In this embodiment, a previously fabricated lens 12A, which might have been manufactured in accordance with the embodiment illustrated in FIGS. 1 through 4, is now utilized to produce a bifocal lens 74A, as illustrated in FIG. 8. In effect, lens 12A forms the upper mold previously described with respect to FIGS. 1 through 4. The holder 24A is similarly utilized in that the lower mold 26A is supported by posts 54A and further includes a bifocal well area or portion 76A. The bifocal well area 76A, by its configuration and orientation relative to the astigmatic axis 22A, will determine particular characteristics of the bifocal lens 74A. The bifocal lens 74A is comprised of lens 12A and a bifocular portion or segment 78A that is formed in the well 76A and further includes a thin layer 80A which extends over the outer spherical convex curved surface 14A of lens 12A. The thin layer 80A terminates in an outer margin 82A, as illustrated in FIG. 8.

The method of manufacturing the bifocal lens 74A includes the placing of the bifocal mold 26A in supportive position within the holder 24A. The lens 12A may be a single focus lens. The bifocal mold 26A rests atop the lower steps 62A with the concave surface 32A facing upwards. The concavity of each mold 26A has formed therein a recess or curvature which differs from that of the lens surface 14A, to receive additional material to create the bifocal effect.

The next step is to locate and position the "stock" lens 12A over the mold 26A, the convex front surface 14A of the lens 12A being directed against the concave surface 32A of mold 26A. The lens 12A being supported by the upper seats or steps 64A of the support posts 54A. The upper steps 64A are so positioned with respect to the lip of the mold as to provide a narrow space between lens 12A and mold surface 32A. Care must be exercised in this step to avoid trapping air bubbles between the liquid and the lens 12A, or in the liquid 70A. There should be used a sufficient amount of the resin 70A that the placing of the lens 12A causes the resin 70A to be spread evenly to form a thin layer of the resin between the mold 26A and the lens 12A.

Excess material, if any, can be scraped away using the marginal edge of the "stock" lens 12A as a guide, or ground away. When the resin is flooded into mold 26A, the spacing between the lens 12A and mold 26A is a matter of a few thousandths of an inch. However, at the recessed portion 76A in concave face 32A of the mold 26A, there will be a thicker mass with a different curvature, to thereby provide the bifocal effect desired. The importance of the horizontal portions of the upper steps 64A being parallel can now be appreciated, it allows the lens 12A and mold 26A to rest parallel to each other and prevents the resultant bifocal lens 74A from having a cast-in prism.

Thereafter, a predetermined amount of a castable resin, as at 70A, is placed onto the concave portion 32A. The amount of resin used is dependent upon the desired diameter and thickness of the bifocal lens 74A sought to be obtained. Usually, about 4 to 6 cc. of the resin will be the appropriate amount. The preferred resin is allyl diglycol carbonate, commercially available under the name CR 39 plastic, but tests using a 100% solution of CR 39 indicate that the boiling characteristics of such a bifocal lens are not adequate. Therefore, it was found necessary to introduce quantities of methyl methacrylate or ethyl methacrylate to the CR 39 in order to improve the boiling characteristics.

These results were obtained by numerous laboratory tests, and are shown in Table I. The tests were made under three types of boiling conditions: one and a half hours of continuous boiling; two hours of continuous boiling; and two hours of intermittent boiling. (Since plastic lenses are tinted in boiling water solutions of dyes, boiling was used as the basis for the tests.) The major causes of lens failure were: crazing resulting from insufficient cure of the applied portion of the bifocal; delamination caused by insufficient adhesion between the applied portion and the original base lens; and splits caused by an uneven expansion of the applied portion and of the original base lens.

The materials to form the lens of the embodiment illustrated in FIGS. 5 through 10 may also be utilized to form the lens previously illustrated with respect to the embodiment in FIGS. 1 through 4, as well as the embodiment hereinafter discussed with respect to FIGS. 11 and 12.

portion 78A. By providing this capability, it is possible to customize the desired bifocal lens 74A since the lens 12A can be appropriately turned so that the resin 70A will accumulate at the individual point or area desired.

The indicia means 84A may be provided on the base upper surface 48A and include a plurality of circumferentially disposed markings 86A. As indicated, the reference orientation of 0°; 90°; 180°; and 270°. This permits the aligning of the astigmatic axis 22A of the lens 12A relative to the recessed well portion 76A in a predetermined orientation. In this manner, the bifocular portion 78A is formed on the lens 12A in a desired position dependent upon the prescribed needs of the prospective user thereof. By indicating visually the positionable angular degree of orientation by the indicia means 84A, the desired adjusting may take place.

With particular reference to FIG. 10, shim means 88A may be utilized in the form of a wedge element 90A which is placed around one of the upper support steps 64A to achieve a desired degree of decentration of the optical center with respect to the bifocal segment 78A, and to achieve this decentration for any angle required in any prescription. The wedge element 90A may be used on either one, two or possibly three of the four support steps 64A.

The entire assembly is now placed in an air circulating oven 72A for curing. Since CR 39 cures slowly at low temperatures and quickly at high temperatures, a variety of curing cycles are available. For instance, sixteen hours at 135° F. and then forty minutes at 180° F. gives a well cured bifocal lens 74A. However, it is desirable to turn over the expensive molds as many times as possible consistent with quality production; therefore, shorter cycles have been used and have provided lenses with excellent results and full cure. Two acceptable shorter cycles are: thirty minutes at 160° F.,

TABLE I

| | SUMMARY OF FORMULATION MODIFICATIONS | | | | | | | | |
|---|---|---|---|---|---|---|---|---|---|
| | 1½ Hrs Continuous Boiling | | | 2 Hrs Continuous Boiling | | | 2 Hrs Intermittent Boiling | | |
| Formulation | Pcs Tested | Pcs Failing | Type of Failure | Pcs Tested | Pcs Failing | Type of Failure | Pcs Tested | Pcs Failing | Type of Failure |
| A | 30 | 15 | S,C | 8 | 8 | C,D,S | 28 | 27 | S,C |
| B | 15 | 15 | S,C | | | | 15 | 15 | S,C |
| C | 6 | 1 | S | 6 | 6 | S,C | 5 | 4 | S,C |
| D | 6 | 2 | C | 6 | 6 | S,C | 6 | 6 | C |
| E | | | | 8 | 7 | S,C,D | 8 | 7 | S,C,D |
| F | | | | 5 | 5 | S,C,D | | | |
| G | | | | 4 | 4 | S,C | 2 | 2 | S,C |
| H | | | | 4 | 1 | S | 2 | 2 | S,C,D |
| I | 9 | 7 | C,S | 6 | 6 | S | 42 | 14 | S,C |
| J | 5 | 0 | | 20 | 6 | S,C,D | 19 | 6 | S,C,D |
| K | 8 | 0 | | 8 | 2 | C | 8 | 1 | S |

C = Craze
D = Delamination
S = Split
Formulations Used
A = 100% CR 39
B = 97% CR 39 3% triallyl cyanurate
C = 85% CR 39 15% p444 polyester resin
D = 70% CR 39 30% vinyl acetate
E = 70% CR 39 20% p444 10% triallyl cyanurate
G = 85% CR 39 15% ethyl methacrylate
H = 75% CR 39 25% ethyl methacrylate
I = 80% CR 39 20% methyl methacrylate
J = 75% CR 39 25% methyl methacrylate
K = 70% CR 39 30% methyl methacrylate In order to provide for individualized astigmatic correction, as illustrated in FIG. 5, there is provided indicia means 84A operatively associated with the holder 24A so as to permit prescribed angular orientation of either the mold 26A or the lens 12A relative to each other so as to obtain a resultant bifocal lens 74A with a prescribed astigmatic axis 22A relative to the bifocular thirty minutes at 170° F., and thirty minutes at 180° F.; and twenty minutes at 170° F., twenty minutes at 180° F., and twenty minutes at 190° F.

After curing, the assembly is allowed to cool to about 140° F., and the lens 74A is then separated from the mold 26A, the newly cast bifocal film portion 80A is integral with the original lens 12A. The resultant lens 74A, after edge grinding for peripheral spacing, is now a complete bifocal lens, including distance correction, astigmatic correction at the proper axis, and the reading correction at the proper location, the lens also being properly decentered according to the individual prescription. One of the ways to separate the lens and the mold is to permit the assembly to cool to room temperature, and the lens 74A will separate spontaneously from mold 26A. Another and faster way is to insert a razor blade just at the edge of the point of contact between the lens 74A and mold 26A. Accordingly, the finished bifocal lens 74A illustrated in FIG. 9 has the bifocular portion 78A contained on the convex surface of the lens 74A, as illustrated in FIG. 8. The bifocular portion 78A may include a horizontally extending ledge 92A.

A final embodiment of an apparatus 10B for the manufacture of a bifocal lens 76B is depicted in FIGS. 11 and 12 wherein similar parts are denoted by similar reference numerals. In this embodiment, the lens 76B is formed with the bifocular portion 78B integrally formed thereon at the time of formation of the retaining portion of the lens 76B.

The steps to fabricate the lens 76B are similar to that discussed with respect to that illustrated in FIGS. 1-5. Further the holder 24B may have thereon the indicia means illustrated in FIG. 5. In this manner the final lens 74B is formed with a bifocular portion 78B by having the lower mold 26B provided with a well area 76B. The process by which a particular lens 74B is manufactured is that a previously selected lower mold 26B is positioned on the support posts 54B and retained in place by the lower steps 62B. Once this is accomplished there is a filling of the lower mold 26B with a resin material 70B. In its liquid form the resin material 70B, as illustrated in FIG. 11, is now ready to be formed. The formation of the lens 74B takes place by positioning the upper mold 28B in vertically spaced relationship to the lower mold 26B. This is accomplished since the upper steps 64B are dimensioned to readily receive the upper mold 26B thereon, whereby the resin material 70B is displaced to extend between the overlapping surfaces 32B and 36B of the molds 26B and 28B respectively, to form the configuration of the lens 74B including the bifocular portion 78B.

In the assembled position of the molds 26B and 28B, as illustrated in FIG. 12, there is a curing of the resin material 70B which may take place in an oven 72B, illustrated in phantom, and a subsequent cooling of the resin material 70B to a temperature at which a separating of the lens 74B from between the molds 26B and 28B may take place.

Accordingly, the embodiment of the invention illustrated in FIGS. 11 and 12 may be utilized with the apparatus illustrated in FIGS. 5 and 10, thereby permitting orientation of the bifocular portion 78B, which may be of any predetermined geometric configuration and decentration accomplished by placing wedges on steps 64B. In this manner the pupillary distance may be varied either inwardly or outwardly, upwardly or downwardly.

Attention is directed to the fact that the steps 62 and 64, in all embodiments, have been described as being disposed i respective parallel disposition; however, when a mold is employed which has a convex cylindrical curve (to provide for astigmatic correction), one pair of diametrically opposed steps 62 or 62 will be disposed in a plane parallel to, but vertically disposed from the plane defined by the other pair of diametrically opposed steps 62 or 64. The foregoing may be accomplished by constructing the holder 24 in accordance with the above teachings. Alternatively, the holder may have the construction discussed previously and the steps may be modified to accomodate the convex cylindrical curve of the mold by the utilization of shim means, similar to shim means 88A, in FIG. 10. It will be appreciated that the foregoing describes a lens deemed to have a major axis and a minor axis; otherwise known as a toric lens.

The present invention permits the casting of major corrections on the inner surface, and the outer surface curvature is substantially standardized. Therefore, the number of molds required by a laboratory will be determined solely by the various number of diopter corrections required for the bifocular portion of the completed lens structure, which is approximately 50-75 different molds. Of course, special requirements and conditions may arise increasing the required number of molds for a laboratory. However, if the castings were made pursuant to present state of the art methods, the number of molds required would be astronomical. This is because the present day method is to keep the inner surface constant and cast prescriptions on the outer surface.

It will thus be apparent that the present invention provides a new and novel apparatus for fabricating plastic lens blanks and bifocal plastic lens blanks which do not require any grinding of the astigmatic curve by an ophthamological laboratory. Moreover, the present invention deletes the necessity of utilizing compressive gaskets placed upon upper and lower molds in the formation of said lens blanks. In this regard, attention is directed to the fact that the utilization of the gaskets is quite expensive since they may only be used once and must thereafter be discarded and replaced by a new gasket when utilizing the molds to form additional lens blanks.

It will be apparent to those skilled in the art that the teachings of the present invention are primarily intended for use by an ophthamological laboratory. However, it is within the realm and teachings of the present invention to enable an optician to fabricate the lenses within his business establishment should he wish to provide the required initial investment for the method and apparatus of the present invention.

However, the most important advantage obtained by the use of the present invention is that both ophthalmic lenses and bifocal ophthalmic lenses may be cast in accordance with an ophthamologist's prescription and without necessitating any grinding of the lenses to orient the astigmatic axis of said lenses to the prescribed angular orientation.

While I have shown and described the various preferred embodiments of the invention, it will be appreciated that the teachings herein will readily lend itself to many modifications, changes, combinations and improvements by those skilled in the art, without deviating from the present invention or the teachings hereof.

What is claimed is:

1. Apparatus for fabricating a lens utilizing an upper mold and a lower mold comprising in combination
   a holder including a base portion,
   support means operatively associated with said base portion so as to maintain said molds in removably supportive vertically spaced position relative to each other such that a lens is formed intermediate the overlapping opposing surfaces of said molds, said support means comprising a lower step for said lower mold and an upper step for said upper mold, said steps being disposed in substantially parallel relationship to each other so as to obtain a controlled thickness to said lens, and each of said steps being provided with a vertically extending shoulder for confining the molds on each of said steps and for abuttingly engaging a peripheral portion of the respective ones of said molds, thereby maintaining said molds in predetermined fixedly spaced relationship with respect to one another.

2. Apparatus in accordance with claim 1, wherein each of said steps are downwardly and inwardly inclined with respect to said base portion to substantially conform to the angular configuration of said molds.

3. Apparatus in accordance with claim 1, wherein said steps are circumferentially and substantially equidistantly spaced from one another.

4. Apparatus in accordance with claim 3, wherein said upper steps extend outwardly beyond said inner steps so as to be capable of supporting said molds having differing outer diameters.

5. Apparatus in accordance with claim 1, wherein said support means comprises a plurality of support posts extending upwardly from said base portion and having said steps formed thereon.

6. Apparatus in accordance with claim 5, wherein said support posts are circumferentially and substantially equidistantly spaced from one another.

7. Apparatus in accordance with claim 1, including indicia means operatively associated with said holder so as to permit prescribed angular orientation of either one of said molds relative to a prescribed astigmatic axis.

8. Apparatus in accordance with claim 7, wherein said indicia means is provided on said base portion and includes a plurality of circumferentially disposed and preselectedly spaced markings.

9. Apparatus in accordance with claim 8, wherein said markings circumscribe 360° degrees.

10. Apparatus in accordance with claim 8, wherein said lower mold is provided with a bifocal well area so as to cast a bifocal segment on the lens formed with the apparatus.

11. Apparatus in accordance with claim 10, wherein said upper mold is in the form of a previously formed lens so as to integrally cast said bifocal segment onto the outer surface of said lens.

12. Apparatus in accordance with claim 1, including shim means adapted to be positioned relative to said support means for decentration of the lens to be formed.

13. Apparatus for fabricating a bifocal lens, comprising in combination a previously formed lens, a mold having a bifocal well area so as to cast a bifocal segment on the spherical outer curve of said previously formed lens, a holder including a base portion, support means operatively associated with said base portion capable of maintaining said mold and said previously formed lens in removably supportive and vertically spaced position relative to one another, said support means comprising a lower step for said mold and an upper step for said previously formed lens, said steps being disposed in substantially parallel relationship to each other so as to obtain a controlled thickness to said lens, and each of said steps being provided with a vertically extending shoulder for confining said mold and said previously formed lens on said lower and upper steps, respectively, and for abuttingly engaging a peripheral portion of said mold and said previously formed lens, thereby maintaining said mold and said previously formed lens in predetermined fixedly spaced relationship with respect to one another.

14. Apparatus in accordance with claim 13, wherein each of said steps is downwardly and inwardly inclined with respect to said base portion in order to substantially conform to the angular configuration of said mold and said lens, said steps being circumferentially and substantially equidistantly spaced from one another, and said upper steps exend outwardly beyond said lower steps so as to be capable of supporting said mold and said lens having differing outer diameters.

15. Apparatus in accordance with claim 13, wherein said support means comprises a plurality of support posts extending upwardly from said base portion and having said steps formed thereon, and said support posts are circumferentially and substantially equidistantly spaced from one another.

16. Apparatus in accordance with claim 13, including indicia means operatively associated with said holder so as to permit prescribed angular orientation of either said mold or said lens relative to one another so as to obtain a lens with a prescribed astigmatic axis.

17. Apparatus in accordance with claim 16, wherein said indicia means is provided on said base portion and includes a plurality of preselectedly spaced circumferentially disposed markings.

* * * * *